J. LUNDIE.

TIE PLATE.

APPLICATION FILED AUG. 16, 1915.

Reissued May 2, 1916.

14,124.

Witnesses:
C. A. Jarvis.

Inventor
John Lundie
by Geo. L. Wheelock
attorney.

UNITED STATES PATENT OFFICE.

JOHN LUNDIE, OF NEW YORK, N. Y.

TIE-PLATE.

14,124. Specification of Reissued Letters Patent. Reissued May 2, 1916.

Original No. 1,065,696, dated June 24, 1913, Serial No. 720,345. Application for reissue filed August 16, 1915. Serial No. 45,830.

*To all whom it may concern:*

Be it known that I, JOHN LUNDIE, a citizen of the United States, residing at New York, in the borough of Manhattan, county and State of New York, have invented certain new and useful Improvements in Tie-Plates, of which the following is a specification.

This invention relates to improvements in tie-plates for railroads.

Objects of the invention are to provide a tie-plate which in use will locate all the bearing surfaces in such position as to be normal to the line of the thrust of the wheels or wheel load, and also to provide a tie-plate so constructed as to allow the rail to adjust itself easily under a load without coming in contact with a sharp angle and which will bite into the tie to prevent the plate from slipping endwise.

Other objects are to provide a durable, practical and efficient tie-plate.

These being among the objects of my invention, the same consists of certain features of construction and combinations of parts to be hereinafter described and then pointed out in the claims with reference to the accompanying drawings showing a suitable embodiment of the invention, and in which—

Figure 1:
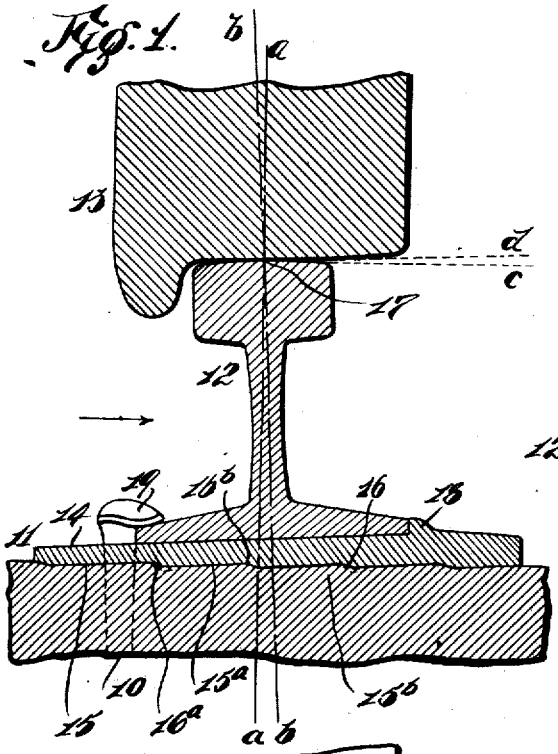
Figure 3:
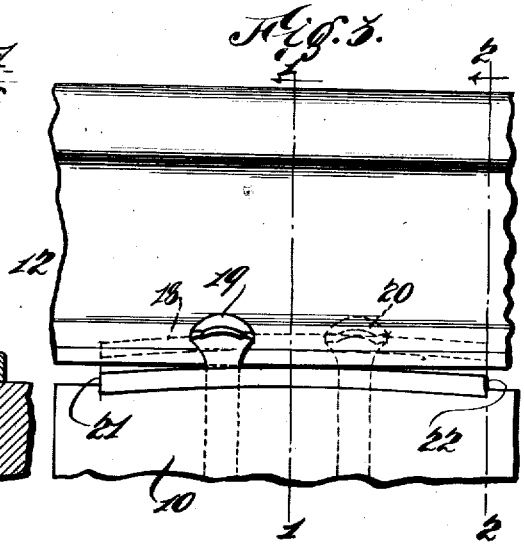
Figure 2:
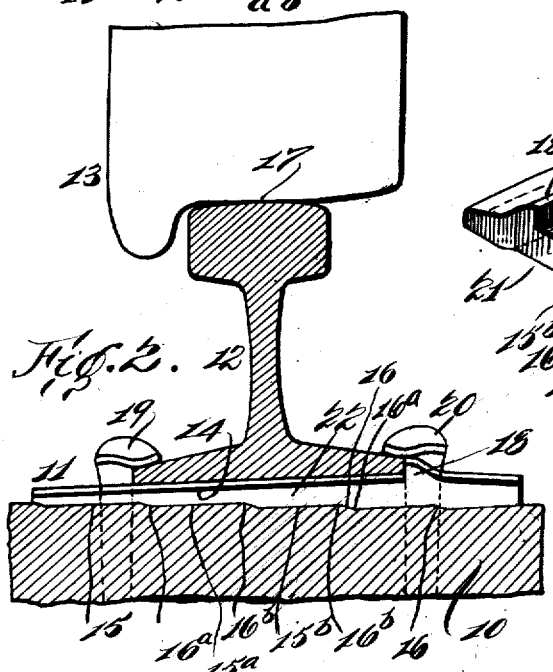
Figure 4:
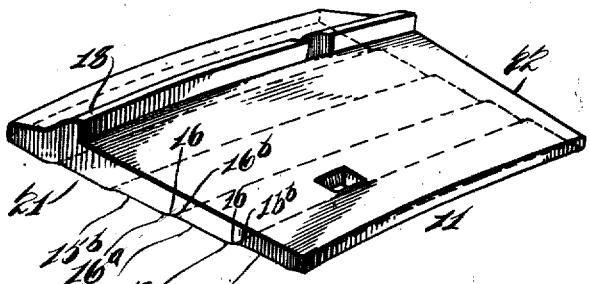

Figure 1 is a transverse section on the line 1—1, Fig. 3, looking in the direction of the arrow, and showing a spiked rail and tie-plate with a fragment of a wheel passing over the rail; Fig. 2 is a transverse section, illustrating the same parts taken on the line 2—2 Fig. 3, and looking in the direction of the arrow; Fig. 3 is a side elevation of a spiked rail and tie-plate showing a fragment of a tie in section; and Fig. 4 is a perspective view of the preferred construction of tie-plate.

Referring to the drawings, the tie 10 supports the tie-plate 11 which in turn supports the rail 12, and 13 indicates a car-wheel. Preferably said tie-plate is of generally rectangular form and its greatest dimension extends in a direction at substantially right angles to the length of the rail which it supports, and is adapted to be seated on and secured to a single tie. A standard car-wheel is provided with a tread having a 1 in 20 bevel and as the webs of the rails usually stand vertically, a side thrust is produced on the rails which is open to more or less objection. It has been proposed to provide a tie-plate with an inclined surface on which the base of the rail rests so that the rail shall be inclined, but so far as I know, no one has ever suggested the specific arrangement of all the bearing surfaces so that they shall be normal to the line of wheel load. To this end my improved tie-plate is preferably constructed as follows: The upper surface or rail seat 14 of the tie-plate 11 is inclined transversely for substantially its entire dimension. The lower surface is constructed with a series of steps or stepped projections, which series extends transversely of the tie-plate, so as to provide bearing surfaces 15, $15^a$, $15^b$ and so on. Said surfaces are stepped relatively to each other and extend across the tie-plate and terminate at opposite edges thereof, as indicated by dotted lines in Fig. 4. The surfaces 15, $15^a$ and $15^b$ or as many bearing surfaces as there are on the underside of the tie-plate, are not only parallel with each other but are in planes parallel with the inclined upper surfaces 14 of the plate. The stepped surfaces 15, $15^a$ and $15^b$ and so on, are joined by curved surfaces $16^a$ so as to avoid sharp corners. It will be seen that the series of steps is substantially parallel with the axis of the tie-plate which extends transversely of said series but that the individual surfaces are not parallel therewith. The bearing surface 17 of the head of the rail 12 will likewise be parallel with the before-mentioned surfaces 14 and 15, $15^a$ and $15^b$. The tie-plate near one edge is provided with a well-known rail-retaining flange 18, and the plate and rail are secured in position in the usual manner by means of spikes such as 19 and 20 which pass through suitable openings in the tie-plate.

The principle of the described construction is more clearly illustrated in Fig. 1. In this figure the vertical is indicated by *a;* while *b* indicates the line of stress which is normal to all bearing surfaces including the surface 17 of the rail head, 14 of the tie-plate and the stepped surfaces 15, $15^a$ and $15^b$ and so forth at the underside of the tie-plate. As compared with a standard wheel, the inclination of the dotted line *b* to the vertical is 1 in 20. The horizontal is indicated by *c* but the bearing surface 17 corresponds with the inclination of the bevel of the car-wheel if it be standard, that is to say, 1 in 20, and this inclination to the horizontal is indicated by *d*. The series of stepped surfaces 15, 15[a], 15[b] and so forth at the underside of the tie-plate are normal to the line of stress for the purpose of neutralizing the side thrust, due to the beveled bearing of the wheel, which is a valuable feature in connection with the construction described. The curves connecting said lower bearing surfaces are for the purpose of preventing the breaking of the fibers of the tie such as 10. Such tie must obviously be of yielding material such as wood.

Stated differently, my invention comprehends a tie-plate having a peculiar under surface construction and formation which comprises under, stepped, projections extending parallel to the length of the rail, each of said projections having a plane bearing surface 15 or 15[a], etc., inclined toward one edge of the plate away from the plane in which all of the high points or edges 16[a] lie, while shorter surfaces 16 extend substantially at an oblique angle with respect to said surfaces 15, etc., the inclination of said surfaces 16 being approximately 45° to the rail-bearing surface of the plate. Furthermore, the inner corners or points 16[b], where the bearing surfaces 15, etc., merge into the inner ends of the surfaces 16, are also curved; in consequence of which substantially ogee curves connect the successive bearing surfaces 15, etc., thereby providing a reliable stepped under surface and a strong tie-plate, which in use has considerable lateral resistance imparted thereto by the action of the abrupt surfaces 16 of the said projections. It will also be noticed that the greater thicknesses of said tie-plate are located at those portions of the stepped projections which are nearest to the rail-retaining flange 18. I therefore claim the described peculiar under surface, in a tie-plate as such.

Another highly important feature of the present invention consists in a slight camber of the tie-plate which extends from edge 21 to edge 22 and which is longitudinal to the line of the track for the purpose of preventing the rail in its deflection under a wheel load from coming in contact with a sharp edge and at the same time decreasing the span of the rail deflected, while acting in the nature of a continuous beam. Preferably, and for the purpose of cambering the tie-plate, the same is bent up from a metal plate, and in such manner that the convexity of the plate is at the upper surface 14 and corresponds with the extrados of an arch while the incurve is at the lower surface and corresponds with the intrados of an arch. A further advantage of the camber is that it allows a slight bite of the ends 21 and 22 of the plate into the tie 10, thus preventing the plate from crawling or slipping endwise in the length of the rail. It will be seen that the rail rests on the convex summit of the upper surface 14 so as to produce a more suitable bearing surface than if the summit were angular, and thus shortens the rail span without the rail in its deflection being in danger of coming in contact with one of the sharp ends of the plate.

A further advantage in the present invention is that the improved tie-plate produces its own seat in the tie.

The plate may be made of steel and bent in a bulldozer and punched at the same operation. It is clear that the illustrated form of the invention is susceptible of modification, and that I am not limited to details of construction.

Having thus described my invention, what I claim as new is:—

1. A tie-plate for railway rails, the same having an upper rail seat normal to the line of thrust of the standard coned tread car-wheel, and lower stepped surfaces parallel with said seat.

2. A tie-plate for railway rails, the same having an upper rail seat normal to the line of thrust of the standard coned tread car-wheel, and lower stepped surfaces parallel with said seat, said surfaces being joined by curves.

3. A tie-plate for railway rails, the same having an upper rail seat normal to the line of thrust of the standard coned tread car-wheel, and lower stepped surfaces parallel with said seat, said plate having a camber which is longitudinal to the line of track.

4. The combination of a tie-plate having an upper rail seat which is normal to the line of thrust of the standard coned tread car-wheel and lower stepped surfaces parallel with said seat, and an inclined rail resting on said seat.

5. The combination of a tie of yielding material having no previously formed seat, a tie-plate constructed to produce its own seat in said tie by biting into it, and a rail, all of the bearing surfaces of which parts, that is to say said tie-plate and rail, are normal to the line of thrust of a standard coned car-wheel.

6. A tie-plate for railway rails, the same having under stepped projections parallel to the length of the rail, each step projection having a bearing surface which is inclined upwardly with respect to the horizontal plane of the edges of said projections and also having a surface which is inclined at an angle approximately 45° to the rail bearing surface of said plate.

7. A tie-plate for railway rails, the same having under stepped projections parallel to the length of the rail, each step projection having a bearing surface which is inclined upwardly with respect to the horizontal plane of the edges of said projections, and also having a surface which is inclined at a substantial oblique angle with respect to the aforesaid surface and at an angle of approximately 45° to the rail bearing surface of said plate.

8. A tie-plate for railway rails, the same having under stepped projections parallel to the length of the rail, each step projection having a bearing surface which is inclined upwardly with respect to the horizontal plane of the edges of said projections and also having a surface which is inclined at an angle of approximately 45° to the rail bearing surface of said plate, said projections being of rounded or convex form at said edges.

9. A tie-plate for railway rails, the same having an area such that it is adapted to be seated on and secured to a single tie only, and having under stepped projections and an upper rail-retaining flange parallel to the length of the rail, the greater thicknesses of said plate being at those portions of said projections which are nearest to said flange.

10. A tie-plate for railway rails, said plate being of generally rectangular form and having its greatest dimension in a direction at substantially right angles to the length of the rail which it is to support, said plate being adapted to be seated on and secured to a single tie and having its under or tie-engaging surface formed with transverse projections extending substantially parallel to the length of the rail, said projections extending from edge to edge of the plate and having plane bearing surfaces inclined toward one end of the plate, and said projections also having surfaces which adjoin and are substantially oblique to said bearing surfaces.

JOHN LUNDIE.

Witnesses:
GEO. L. WHEELOCK,
CHAS. CLARK.

Disclaimer in Reissue Letters Pat. No. 14,124.

DISCLAIMER.

14,124, (Reissue.)—*John Lundie*, New York, N. Y. TIE-PLATE. Patent dated May 2, 1916. Disclaimer filed January 15, 1917, by the patentee.

He therefore disclaims as to said patent, reissue 14,124, all tie-plates included in the construction specified in claim 9, except tie plates in which "the greater thicknesses of said plate" mentioned are caused to be "at those portions of said projections which are nearest to said flange" by a rail-bearing surface inclined upwardly toward the rail-retaining flange, and in which the rail-bearing surface is also curved longitudinally of the rail flange so that the rail in its deflection will have a rolling bearing upon said surface.

[*Official Gazette, January 23, 1917.*]